Patented Jan. 28, 1936

2,028,959

UNITED STATES PATENT OFFICE 2,028,959

MANUFACTURE OF AZO COLORS

James D. Todd, Laurence E. May, and William L. Newbury, Chicago, Ill., assignors to The Sherwin-Williams Company, Chicago, Ill., a corporation of Ohio No Drawing. Application April 26, 1933,
Serial No. 668,031

7 Claims. (Cl. 260—89)

The present invention relates to the manufacture of azo dyes, and particularly pigments. It has special reference to improving the color value, both in hue and tinctorial power, and to improving the physical form of pigments for incorporation and use in vehicles, as in varnishes, oils, lacquers, rubber, resins, and the like.

It has heretofore been attempted to increase certain valuable qualities of dyestuff pigments by increasing the dispersing qualities through the addition of certain dispersing agents such as Turkey red oil, resin and others. There are certain disadvantages in these materials. For example, these have a diluting effect, inhibit drying, increase bleeding and retard wetting of the pigment by a vehicle during the incorporation process. The present process aims to secure advantages of the above agents and gives better effects than these addition products without any of the attendant disadvantages.

We have discovered that the presence of a foreign diazonium compound in the diazo mixture to be coupled may have remarkable effects, even in small quantities, to produce the desirable condition above referred to. By "foreign" we mean a diazonium compound of an amine which is not ordinarily present as an isomer or as a commercial attendant impurity in the principal amine employed for a certain color, and at the same time an amine which the art does not consider suitable or does not generally employ as a principal amine for pigment colors.

The primary object of the present invention is the beneficial adulteration of the principal diazonium compound to be coupled to form a pigment base by the addition of a diazonium compound of a foreign amine.

A specific object of the invention is the adulteration of Tobias acid as the principal amine which is to be diazotized and coupled with beta-naphthol to form a pigment base, by the addition of a foreign amine, then diazotizing the principal and foreign amines, and coupling with beta-naphthol to form with the diazonium compound of the principal amine a pigment-forming dyestuff.

Other and ancillary objects and advantages of the invention will be apparent from the following description and explanation of the invention in which illustrative examples are given, having the preferred materials and procedure through which the advantages are clearly exhibited.

A large number of amine compounds are available for diazotization followed by coupling with one or more intermediate bases to form dyestuffs. As is well known the color and character of the dyestuff obtained is determined by the choice of components. It is also well known that the quality and tinctorial and physical character are also determined by the procedure of coupling and the composition of the solution in which coupling is effected.

We have taken advantage of this knowledge by finding that the presence of a diazonium compound of an amine which is distinctly foreign to the type product desired, may have a marked and beneficial effect upon the properties of the principal product. The amount and character of the diazotized foreign amine may vary over a wide range.

The dyestuff forms pigments capable of incorporation into vehicles to form paints, enamels, lacquers, inks, and the like.

Tobias acid is an amine commonly diazotized and coupled with a suitable agent, such as beta-naphthol to form an azo dyestuff to be made into pigment form by conversion to an insoluble salt, such as the barium or calcium salt. In order to illustrate what may be excluded as an agent of this invention from the scope of the designation "foreign", the nature of pure and commercial Tobias acid is discussed. Tobias acid is 2-naphthylamine-1-sulphonic acid. In making this acid, like most organic products used in the dyestuff industry, isomers and secondary substances are formed which remain as impurities with the principal desired product. Such impurities for Tobias acid are: 2-naphthylamine-6-sulphonic acid, 2-naphthylamine-8-sulphonic acid, and 2-naphthylamine-1,6-disulphonic acid. These are not "foreign" to Tobias acid. They are pigment-dyestuff intermediates, and in this particular are not foreign to the list of pigment-dyestuff-forming intermediates.

In carrying out the present invention the mixed diazonium compounds are present together prior to union with the coupling agent, so that the principal and the added amine, in diazonium form, are exposed to the same conditions for reaction in the coupling bath, whereby the improvement in product is secured. We may mix the amines before joint diazotization of them, or may separately diazotize the amines and mix them together prior to union with the coupling agent; or add both of them simultaneously to the coupling bath. The latter course is not as well recommended as the two former courses, because success with it will depend upon manipulation of the uniting liquids.

Example I 105.9 parts of commercial or pure Tobias acid and 7.6 parts of 2-naphthylamine-4,8-disulphonic acid, are solubilized in water using 22 parts of sodium hydroxide. The mixed amines are then diazotized as by use of 35 parts of sodium nitrite and 171 parts of hydrochloric acid solution of 18° Bé. Ordinarily this is carried out in the cold by adding the sodium nitrite to the acidified amines. Of course the diazotization process may be varied as is well known in the art.

The coupling solution may be prepared by placing 50 parts of sodium carbonate in 4500 parts of water, and adding to it a solution containing 75 parts of beta-naphthol and 3.2 parts of sodium hydroxide and sufficient water to effect solution. The coupling bath is adjusted to a suitable temperature, such as 22° C.

To this the normally colder suspension of the diazotized amines is added. Coupling proceeds quickly and automatically by reason of the inherent reactivity of the two liquid mixtures.

There is formed a sodium salt of a dyestuff in practically insoluble form which may or may not be filtered. If filtered, the salt is sludged in 3000 parts of water. In either case, the volume is increased to 10500 parts by adding water. To this is added a solution having a metal ion capable of forming a more insoluble pigment salt, such as the barium or calcium ion. Where barium is employed, a solution of 75 parts of barium chloride in 750 parts of water may be used. Where calcium pigment is desired, a precipitant solution of 51 parts of calcium chloride in 510 parts of water is suitable. Other metal salt in equivalent molecular proportion may be substituted.

In effecting precipitation by either of the above precipitant solutions the liquid is heated, for example to the boiling point, where it may be maintained for a short time, such as 10 minutes. The pigment, thus suitably formed, is filtered, washed, dried and ground, if the dry form is desirable.

The barium toner formed as above described has a high tinting strength, being apparently more highly dispersable. It is from 10% to 30% stronger than the product made without the presence of the foreign amine in the process. To test the color values for comparison, an ink may be drawn down on paper by wiping one portion to a thin film on the surface of the paper, and leaving another portion with a thicker film of the ink on the paper. The wiped portion by reflection exhibits the so-called print shade, and by transmission the so-called undertone. The thicker film exhibits by reflection the so-called mass tone. Using an ink with the barium toner, the mass tone is deeper and much brighter than with an ink similarly made without the use of this invention. The print shade is more brilliant with a characteristically different bronze appearance. The undertone is extremely transparent with a yellower cast, which is a property frequently desired. Inks formed by use of lithograph varnish have exceptionally fine working qualities, and possess a considerably lower oil absorption than inks having the usual dispersing agents above referred to. Where the calcium pigment is formed similar advantages will be found as in the barium pigment.

Example II 105.9 parts of Tobias acid and 5.6 parts of the foreign amine 1-naphthylamine-4-sulphonic acid (naphthionic acid), are diazotized in the usual way, and coupled and precipitated as in Example I, using beta-naphthol in the same way, and either the calcium or barium precipitant. Among the advantages obtained is a noticeable increase in brilliance.

Example III 105.9 parts of Tobias acid and 5.6 parts of Cleve's acids (a mixture of 1,6 and 1,7 naphthylamine sulphonic acids) are diazotized in the usual way, coupled with beta-naphthol, and precipitated as calcium or barium salt, as in Example I. The barium toner produced from this mixture of amines is considerably darker, somewhat bluer than the regular type, and has excellent covering power. The calcium toner is considerably darker in mass tone, has very much less bronze in the print shade and has greater tinctorial strength than the regular type.

Example IV

For the mixed amines in Example I, we substitute 100.4 parts of Tobias acid and 11.2 parts of 2-naphthylamine-7-sulphonic acid.

Example V

For the mixed amines of Example I, we substitute 100.4 parts of Tobias acid, 5.6 parts of 1-naphthylamine-4-sulphonic acid and 5.6 parts of 2-naphthylamine-7-sulphonic acid.

No attempt is made to explain the nature of what takes place, but it has been well established that the auxiliary amine is beneficial in forming a dyestuff of different characteristics and of new and improved color and qualities. Generally the colors are from 10% to 30% stronger. It can readily be seen that the tinctorial strength, especially when the pigment is used for printing inks or tints, is so much greater that it permits of an increased amount of less costly inerts to be used, or a proportionately smaller amount of color to be used to produce the same effect. The improvements resulting from the present invention are exhibited in the more concentrated forms by new and different shades, and in the more distended forms also by new shades, and by greater strength per unit weight. The results are obtained with small amounts as well as with large amounts of the foreign amine, such as from ½% to 25%, on a molecular basis, of the foreign amine to the principal amine. These amounts are not set forth as critical limits of the invention. Therefore the invention is not considered as limited to any small or any large amount, or to any particular foreign amine.

The precise step upon which the invention is founded takes place in the coupling action, and therefore its effect resides in the immediate product of coupling. The improvement appears to be latent in part and is most patent when a pigment has been formed and the pigment distended as by formation of a varnish or ink. The more concentrated forms of the product embodying the improvement, such as the azo dyestuff, any soluble salts, or solutions, or an insoluble dry pigment form give but little if any, indication of the full value of the improvements above referred to.

Accordingly, since the dyestuff itself incorporates the improvement in latent form, and in a vehicle the composition incorporates it in patent form, it is considered that the latent and patent forms, and all the intervening forms fall within the scope of the invention.

It has not been deemed necessary to describe the incorporation of the pigment forms in oils, varnish, lacquer, rubber resins or like vehicles for making paints, enamels, lacquers, inks and the like. Any of the well known procedures of the prior art may be used.

In our copending joint application, Serial No. 668,030, filed April 26, 1933, concurrently herewith, we describe another method of securing similar advantages, by having present in the coupling bath a quantity of 1-phenyl-3-methyl-pyrazolone, where Tobias acid is diazotized and coupled with beta-naphthol, as there given. The present invention requiring the presence of a foreign amine in diazonium form may be used in conjunction with the invention of said application, requiring the presence of phenyl-methyl-pyrazolone in the coupling bath.

It is to be understood that the invention is therefore not limited specifically to the materials herein given by way of illustration, so long as there is present during the coupling reaction in the manufacture of the resulting dye-stuff Lithol red, which is capable of forming pigments, diazotized Tobias acid as the principal amine, and a diazotized auxiliary amine, which is foreign to the principal amine and foreign to the art as a principal amine for producing a pigment-forming dyestuff. Such variations of the process as are herewith suggested and indicated are considered as falling within the scope of the invention as defined in the appended claims.

We claim:

1. The method of forming a dyestuff which comprises diazotizing Tobias acid, and coupling said diazotized Tobias acid with beta-naphthol, while simultaneously coupling with said beta-naphthol a smaller quantity of a diazotized amine selected from the group consisting of 2-naphthylamine-4,8-disulphonic acid, 1-naphthylamine-4-sulphonic acid, Cleve's acids, and 2-naphthylamine-7-sulphonic acid.

2. An azo dyestuff comprising the component Tobias acid coupled with beta-naphthol, and containing as impurity the azo dyestuff formed simultaneously therewith having a component selected from the group consisting of 2-naphthylamine-4,8-disulphonic acid, 1-naphthylamine-4-sulphonic acid, Cleve's acids, and 2-naphthylamine-7-sulphonic acid, coupled with beta-naphthol.

3. A pigment comprising an insoluble pigment salt of an azo dyestuff comprising the component Tobias acid coupled with beta-naphthol, and containing as impurity the azo dyestuff formed simultaneously therewith having a component selected from the group consisting of 2-naphthylamine-4,8-disulphonic acid, 1-naphthylamine-4-sulphonic acid, Cleve's acids, and 2-naphthylamine-7-sulphonic acid, coupled with beta-naphthol.

4. The method of forming a dyestuff which comprises diazotizing Tobias acid, and coupling said diazotized Tobias acid with beta-naphthol, while simultaneously coupling with beta-naphthol a lesser quantity of diazotized naphthylamine sulfo acid which is distinctly foreign to the Tobias acid employed.

5. A pigment comprising an insoluble barium salt of an azo dyestuff comprising the component Tobias acid coupled with beta-naphthol, and containing as impurity the azo dyestuff formed simultaneously therewith having a component selected from the group consisting of 2-naphthylamine-4,8-disulphonic acid, 1-naphthylamine-4-sulphonic acid, Cleve's acids, and 2-naphthylamine-7-sulphonic acid, coupled with beta-naphthol.

6. The method of forming a pigment which comprises diazotizing Tobias acid, diazotizing a lesser quantity of naphthylamine sulfo acid which is distinctly foreign to Tobias acid, coupling the diazotized amines in the presence of each other with beta naphthol, and forming an insoluble pigment salt of the resulting dyestuff product.

7. A pigment coating composition suitable for paint, enamel, lacquer, ink and the like, comprising a pigment in the form of an insoluble metal salt of the dyestuff product formed by simultaneously coupling with beta naphthol the mixed diazotized amines: Tobias acid and naphthylamine sulpho acid which is distinctly foreign to Tobias acid; and a vehicle incorporating said pigment salt in dispersed form.

JAMES D. TODD.
LAURENCE E. MAY.
WILLIAM L. NEWBURY.